(12) United States Patent
Itagaki et al.

(10) Patent No.: US 12,499,547 B2
(45) Date of Patent: *Dec. 16, 2025

(54) IMAGE PROCESSING DEVICE, IMAGE PROCESSING METHOD AND STORAGE MEDIUM FOR SHORTENING PROCESSING OF IMAGE PROCESSING

(71) Applicants: FUJIFILM Corporation, Tokyo (JP); FUJIFILM Business Innovation Corp., Tokyo (JP)

(72) Inventors: Kazuyuki Itagaki, Tokyo (JP); Takashi Nagao, Kanagawa (JP)

(73) Assignees: FUJIFILM Corporation, Tokyo (JP); FUJIFILM Business Innovation Corp., Tokyo (JP)

( * ) Notice: Subject to any disclaimer, the term of this patent is extended or adjusted under 35 U.S.C. 154(b) by 814 days.

This patent is subject to a terminal disclaimer.

(21) Appl. No.: 17/184,601

(22) Filed: Feb. 25, 2021

(65) Prior Publication Data

US 2021/0183067 A1 Jun. 17, 2021

Related U.S. Application Data

(63) Continuation of application No. PCT/JP2019/033091, filed on Aug. 23, 2019.

(30) Foreign Application Priority Data

Aug. 31, 2018 (JP) .................. 2018-163784

(51) Int. Cl.
*G06T 7/11* (2017.01)
*G06T 5/00* (2024.01)

(52) U.S. Cl.
CPC .................. *G06T 7/11* (2017.01); *G06T 5/00* (2013.01); *G06T 2207/20021* (2013.01); *G06T 2207/20072* (2013.01)

(58) Field of Classification Search
None
See application file for complete search history.

(56) References Cited

U.S. PATENT DOCUMENTS 7,602,392 B2 * 10/2009 Nagao ...................... G06T 1/60
345/506
7,602,394 B2 10/2009 Seki et al.
(Continued)

FOREIGN PATENT DOCUMENTS

| CN | 1873685 | 12/2006 |
|---|---|---|
| CN | 1873690 | 12/2006 |

(Continued)

OTHER PUBLICATIONS

Machine translation of WO2017163441, Filed Jul. 27, 2016, Published Sep. 28, 2018, Available online at https://patentscope.wipo.int/search/en/detail.jsf?docId=WO2017163441&_cid=P11-LKO9GF-75182-1 (Year: 2016).*

(Continued)

*Primary Examiner* — Tahmina N Ansari
(74) *Attorney, Agent, or Firm* — JCIPRNET

(57) ABSTRACT

An image processing device configured to execute image processing, using respective objects of an object group in which objects configured to execute image processing are connected in a form of a directed acyclic graph, the image processing device including: a division section configured to divide image data into plural items of divisional image data; a control section configured to effect control to cause plural arithmetic devices to execute, in parallel, respective partial processing routines, each of the partial processing routines including image processing to be carried out on a corresponding item of the divisional image data that is stored in a predetermined storage area; and a notification section configured to, in a case in which an item of divisional image data that corresponds to a partial processing routine is stored (Continued)

in the storage area, notify the control section that the item of divisional image data has been stored.

12 Claims, 10 Drawing Sheets

(56) References Cited

U.S. PATENT DOCUMENTS

| | | | | |
|---|---|---|---|---|
| 10,650,481 | B2* | 5/2020 | Nagao | G06F 9/50 |
| 10,795,725 | B2* | 10/2020 | Nagao | G06F 9/5038 |
| 10,878,526 | B2* | 12/2020 | Itagaki | G06T 1/60 |
| 11,341,599 | B2* | 5/2022 | Nagao | G06T 1/20 |
| 2009/0327669 | A1* | 12/2009 | Imada | G06F 9/5066 |
| | | | | 707/E17.014 |
| 2011/0078691 | A1* | 3/2011 | Yildiz | G06F 9/461 |
| | | | | 718/103 |
| 2011/0283093 | A1* | 11/2011 | Imada | G06F 9/3838 |
| | | | | 712/E9.035 |
| 2016/0358312 | A1* | 12/2016 | Kolb, V | G06T 5/73 |
| 2018/0365793 | A1* | 12/2018 | Nagao | G06T 1/60 |
| 2019/0019270 | A1* | 1/2019 | Takemoto | G06T 7/162 |
| 2021/0183067 | A1* | 6/2021 | Itagaki | G06T 1/20 |

FOREIGN PATENT DOCUMENTS

| | | |
|---|---|---|
| CN | 108463836 | 8/2018 |
| JP | 4491026 | 6/2010 |
| JP | 2010146055 | 7/2010 |
| JP | 2014238683 | 12/2014 |
| WO | 2017163441 | 9/2017 |
| WO | WO-2017163441 A1 * | 9/2017 ......... G06F 12/0207 |

OTHER PUBLICATIONS

Google translation of Takahashi, CN187690B, originally published Dec. 6, 2006, and was originally cited by applicant in IDS submitted on Jul. 5, 2024 (Year: 2006).*

Google Patent translation of CN108463836A, cited by applicant in IDS submitted on Feb. 26, 2025, English translation available online https://patents.google.com/patent/CN108463836A/en?oq=CN108463836A, Obtained May 26, 2025. (Year: 2018).*

"Office Action of Japan Counterpart Application" with English translation thereof, issued on Sep. 14, 2021, p. 1-p. 5.

"International Search Report (Form PCT/ISA/210) of PCT/JP2019/033091," mailed on Nov. 26, 2019, with English translation thereof, pp. 1-5.

"Written Opinion of the International Searching Authority (Form PCT/ISA/237) of PCT/ JP2019/033091," mailed on Nov. 26, 2019, with English translation thereof, pp. 1-10.

Office Action of China Counterpart Application, with English translation thereof, issued on May 28, 2024, pp. 1-11.

"Office Action of China Counterpart Application", issued on Oct. 1, 2024, with English translation thereof, p. 1-p. 12.

"Decision of Refusal of China Counterpart Application", with English translation thereof, issued on Nov. 30, 2024, pp. 1-13.

"Reexamination Notice of China Counterpart Application", issued on May 9, 2025, with English translation thereof, p. 1-p. 15.

"Office Action of China Counterpart Application", issued on Jul. 16, 2025, with partial English translation thereof, pp. 1-25.

* cited by examiner

This application is a continuation application of International Application No. PCT/JP2019/033091, filed on Aug. 23, 2019, which is incorporated herein by reference in its entirety. Further, this application claims priority from Japanese Patent Application No. 2018-163784, filed on Aug. 31, 2018, the disclosure of which is incorporated by reference herein in their entirety.

IMAGE PROCESSING DEVICE, IMAGE PROCESSING METHOD AND STORAGE MEDIUM FOR SHORTENING PROCESSING OF IMAGE PROCESSING

CROSS-REFERENCE TO RELATED APPLICATIONS

BACKGROUND

Technical Field

The present disclosure relates to an image processing device, an image processing method, and a storage medium storing an image processing program.

Related Art

There has been disclosed an information processing device that converts a graph structure, which expresses a combination of program modules, into a graph structure in which nodes are divided per divisional input data, and the nodes, at which processings of the prior nodes of the converted structure have ended, are processed in parallel (refer to Japanese Patent No. 4491026).

Further, there have been disclosed techniques of carrying out image processings in parallel in accordance with the order of execution of image processings expressed in the form of a Directed Acyclic Graph (DAG).

However, in the technique described in Japanese Patent No. 4491026, at the time of the start of processing, all of the items of input data that are objects of processing must be stored in a storage within the device, and processing cannot be started until all of the items of input data have been stored in the storage within the device. Therefore, there are cases in which the overall processing time of the processing increases.

SUMMARY

The present disclosure is to provide an image processing device, an image processing method, and a non-transitory storage medium storing an image processing program that may shorten the processing time of image processing overall.

Solution to Problem

A first aspect of the present disclosure is an image processing device configured to execute image processing, using respective objects of an object group in which plural objects configured to execute image processing are connected in a form of a directed acyclic graph, the image processing device including: a division section configured to divide image data, which is an object of the image processing, into plural items of divisional image data; a control section configured to effect control to cause plural arithmetic devices to execute, in parallel, respective partial processing routines, each of the partial processing routines including image processing to be carried out on a corresponding item of the divisional image data that is stored in a predetermined storage area; and a notification section configured to, in a case in which an item of divisional image data that corresponds to a partial processing routine is stored in the storage area, notify the control section that the item of divisional image data has been stored in the storage area.

Note that, in the image processing device of the first aspect, the notification section may carry out the notification by storing, in a notification queue that is configured to be referenced by the control section, notification information that indicates that the item of divisional image data has been stored in the storage area.

Further, in the image processing device of the first aspect, in a case in which there is no partial processing routine that is executable and the notification information is not stored in the notification queue, the control section may transition to a sleep state, and, in a case in which the notification information is stored in the notification queue during a state in which the control section has transitioned to the sleep state, the control section may transition to an active state and effect the control.

Further, in the image processing device of the present disclosure, the control section may effect the control by storing a partial processing routine that is executable, in a task queue that is configured to be referenced by the plural arithmetic devices.

A second aspect of the present disclosure is an image processing method executed by an image processing device configured to execute image processing using respective objects of an object group in which plural objects configured to execute image processing are connected in a form of a directed acyclic graph, the image processing method including: dividing image data, which is an object of the image processing, into plural items of divisional image data; effecting, by a control section, control to cause plural arithmetic devices to execute, in parallel, respective partial processing routines, each of the partial processing routines including image processing to be carried out on a corresponding item of the divisional image data that is stored in a predetermined storage area; and in a case in which an item of divisional image data that corresponds to a partial processing routine is stored in the storage area, notifying the control section that the item of divisional image data has been stored in the storage area.

A third aspect of the present disclosure is a non-transitory storage medium storing a program that causes a computer to execute image processing using respective objects of an object group in which plural objects configured to execute image processing are connected in a form of a directed acyclic graph, the image processing including: dividing image data, which is an object of the image processing, into plural items of divisional image data; effecting, by a control section, control to cause plural arithmetic devices to execute, in parallel, respective partial processing routines, each of the partial processing routines including image processing to be carried out on a corresponding item of the divisional image data that is stored in a predetermined storage area; and in a case in which an item of divisional image data that corresponds to a partial processing routine is stored in the storage area, notifying the control section that the item of divisional image data has been stored in the storage area.

In accordance with the present disclosure, the processing time of overall image processing may be shortened.

DETAILED DESCRIPTION

Examples for implementing the technique of the present disclosure are described in detail hereinafter with reference to the drawings.

First, the structure of a computer 10 that functions as an image processing device is described with reference to FIG. 1. Note that the computer 10 may be a computer that is built-into a copier, a printer, a fax machine, a multifunction device that has the functions of these devices, or an image handling device that carries out image processings internally such as a scanner or the like. Further, the computer 10 may be an independent computer such as a Personal Computer (PC), or may be a computer that is built-into a portable device such as a Personal Digital Assistant (PDA) or a cell phone.

Figure 1:
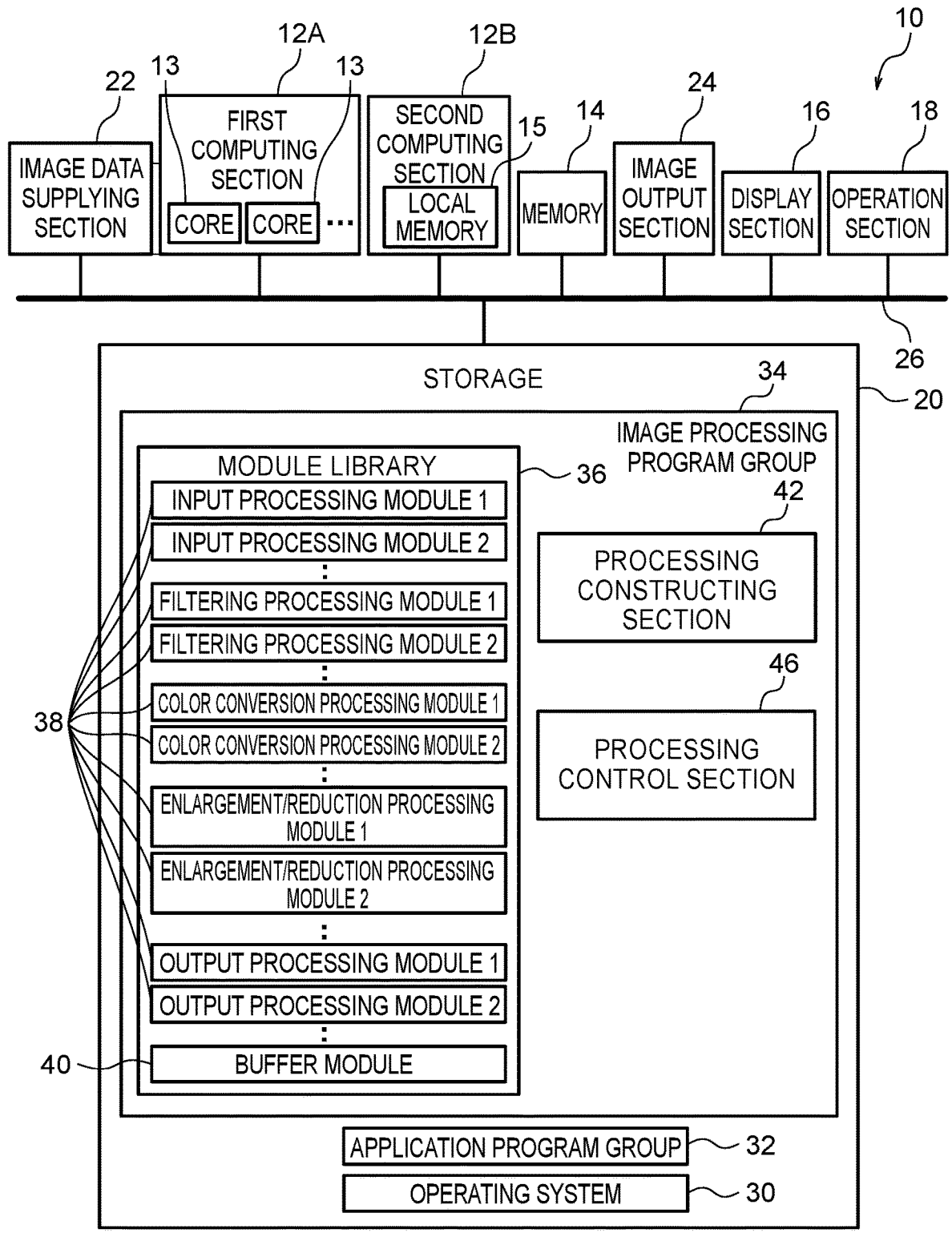
FIG. 1 is a block drawing illustrating an example of the structure of a computer that functions as an image processing device relating to an embodiment.

As illustrated in FIG. 1, the computer 10 relating to the present embodiment has a first computing section 12A, a second computing section 12B, a memory 14, a display section 16, an operation section 18, a storage 20, an image data supplying section 22, and an image output section 24. Further, the respective sections that are the first computing section 12A, the second computing section 12B, the memory 14, the display section 16, the operation section 18, the storage 20, the image data supplying section 22 and the image output section 24 are connected to one another via a bus 26.

The first computing section 12A relating to the present embodiment is the main processor of the computer 10, and is, as an example, a Central Processing Unit (CPU) that has plural processor cores 13 (hereinafter referred to as "cores 13"). Note that each core 13 is an example of an arithmetic device that executes image processings. Hereinafter, when explanation is given by differentiating among the respective cores 13, they are described with a letter appended to the end thereof, such as core 13A, core 13B.

Further, the second computing section 12B relating to the present embodiment is, as an example, a Graphics Processing Unit (GPU) that has a local memory 15 therein. Note that, provided that the second computing section 12B is an arithmetic device that has an internal memory such as the local memory 15 or the like and that carries out image processings on image data stored in the internal memory, the second computing section 12B is not particularly limited, and may be a CPU for example. Alternatively, the second computing section 12B may be a GPU that is built-into the first computing section 12A. Alternatively, the first computing section 12A and the second computing section 12B may be computing units such as Field Programmable Gate Arrays (FPGAs).

The memory 14 is a non-volatile storage device in which the first computing section 12A temporarily stores data. In a case in which image processing is carried out by the second computing section 12B relating to the present embodiment, the first computing section 12A transfers image data, which is stored in a storage area of the memory 14 or the storage 20, to the second computing section 12B via the bus 26. Then, the second computing section 12B stores the image data, which has been transferred from the first computing section 12A, in the local memory 15, and carries out image processing on the stored image data.

In a case in which the computer 10 is built-into an aforementioned image handling device, for example, a display panel such as a Liquid Crystal Display (LCD) e and a tenkey and the like that are provided at the image handling device are used as the display section 16 and the operation section 18. Further, in a case in which the computer 10 is an independent computer, for example, a display, a keyboard and mouse, and the like that are connected to the computer 10 are used as the display section 16 and the operation section 18. Further, the display section 16 and the operation section 18 may be a touch panel display that is structured by a touch panel and a display being made integral, or the like. Further, a non-volatile storage medium such as a Hard Disk Drive (HDD), a Solid State Drive (SSD), a flash memory, or the like may be used as the storage 20.

It suffices for the image data supplying section 22 to be a section that supplies the image data that is the object of processing, and, for example, an image reading section, which reads an image recorded on a recording material such as paper or photographic film and outputs image data, may be used therefor. Further, for example, a receiving section, which receives image data from an external device via a communication line, or the like may also be used as the image data supplying section 22.

It suffices for the image output section 24 to be a section that outputs image data that has undergone image processing, or an image expressed by image data that has undergone image processing, and, for example, an image recording section that records an image expressed by image data onto a recording material such as a paper or a photosensitive material may be used therefor. Further, a display section (e.g., the display section 16) that displays an image expressed by image data on a display, or a writing device that writes image data onto a recording medium such as a Compact Disk Read Only Memory (CD-ROM) or the like, may also be used as the image output section 24. Further, a transmitting section that transmits image data, which has undergone image processing, to an external device via a communication line may also be used as the image output section 24. Further, the image output section 24 may be an image storing section (the memory 14 or the storage 20) that stores image data that has undergone image processing.

As illustrated in FIG. 1, various programs that are executed by the first computing section 12A and the second computing section 12B are stored in the storage 20. Programs of an operating system 30, which manages resources, manages execution of programs, and governs communications between the computer 10 and external devices, and the like, are stored in the storage 20 as the various programs. Further, an image processing program group 34, which is for causing the computer 10 to function as an image processing device, is stored in the storage 20 as the various programs. Further, an application program group 32 (hereinafter referred to as "applications 32") of various types, which is for causing the aforementioned image processing device to carry out desired image processings, is stored in the storage 20 as the various programs.

The image processing program group 34 is programs that have been developed for the purpose of reducing the burden at the time of developing image processing programs that are executed by the aforementioned image handling devices, portable devices, PCs and the like. Further, the image processing program group 34 is programs that have been developed to be executable in common on various types of devices (platforms) such as the aforementioned image handling devices, portable devices, PCs and the like.

In accordance with a construction instruction from the application 32, the image processing device that is realized by the image processing program group 34 constructs an image processing DAG 50A (details of which are described later) that carries out the image processings instructed by the application 32. The above-described image processing device executes the processings of the image processing DAG 50A in accordance with an execution instruction from the application 32. Therefore, the image processing program group 34 provides the application 32 with interfaces for instructing construction of the image processing DAG 50A that carries out desired image processings, and for instructing execution of the image processings by the constructed image processing DAG 50A.

Owing to the above-described structure, in a case in which an arbitrary device that need to carry out image processings therein is newly developed, in regard to the development of programs that carry out the above-described image processings, it suffices to develop the application 32 that causes the image processing program group 34 to carry out the image processings required at the aforementioned arbitrary device, by using the aforementioned interfaces. Accordingly, there is no need for the developer to newly develop programs that actually carry out the image processings, and the burden on developers is reduced.

The image processing program group 34 relating to the present embodiment is described in detail next. As illustrated in FIG. 1, the image processing program group 34 includes a module library 36, programs of a processing constructing section 42, and programs of a processing control section 46.

Programs of plural types of image processing modules 38, which carry out predetermined different image processings, are respectively registered in the module library 36. Examples of these image processing includes input processing, filtering processing, color conversion processing, enlargement or reduction processing (illustrated as "enlargement/reduction processing" in FIG. 1), skew angle sensing processing, image rotating processing, image combining processing, output processing and the like.

Further, the image processing modules 38, at which the types of image processings are the same and the contents of the executed image processings are different, are also registered in the module library 36. In FIG. 1, these types of image processing modules are differentiated by a number being appended to the end thereof, such as "module 1", "module 2". For example, the image processing module 38, which carries out reducing processing that reduces the vertical/lateral size of an image by 50% by thinning-out the input image data by every other one pixel in both of the horizontal direction and the vertical direction, is provided as the image processing module 38 that carries out enlargement/reduction processing. Moreover, for example, the image processing module 38, which carries out enlargement/reduction processing at an enlargement/reduction rate designated for input image data, is provided as the image processing module 38 that carries out enlargement/reduction processing.

Further, for example, the image processing module 38, which converts an image of the Red Green Blue (RGB) color space into an image of the Cyan Magenta Yellow Key-Plate (black) (CMYK) color space, and the image processing module 38, which converts an image of the CMYK color space into an image of the RGB color space, are provided as the image processing modules 38 that carry out color conversion processing. Moreover, for example, the image processing module 38, which converts an image of the RGB color space into an image of the YCbCr color space, and the image processing module 38, which converts an image of the YCbCr color space into an image of the RGB color space, and the like are provided as the image processing modules 38 that carry out color conversion processing.

A buffer module 40 that has storage areas (buffers) for storing image data is also registered in the module library 36.

Figure 2A:
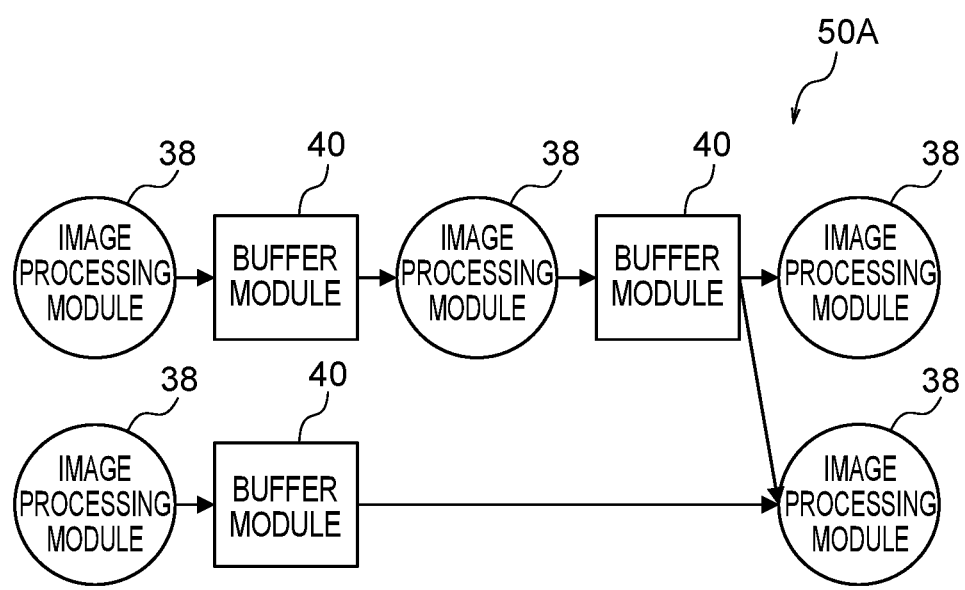
FIG. 2A is a schematic drawing illustrating an example of an image processing DAG.

The processing constructing section 42 relating to the present embodiment constructs the image processing DAG 50A that is in the form of a DAG, in accordance with an instruction from the application 32. As illustrated in FIG. 2A as an example, in the image processing DAG 50A, one or more image processing modules 38 are connected via the buffer modules 40 that are disposed at at least one of the stage before and after the individual image processing module 38.

Note that the individual image processing module 38 is an example of an object that carries out image processing on input image data. Further, the example in FIG. 2A illustrates that, for an image processing module 38 to which another image processing module 38 is connected at the preceding stage via the buffer module 40, execution of its own image processing becomes possible after the image processing by the image processing module 38 at the preceding stage ends. Further, at an image processing module 38 to which plural image processing modules 38 are connected at the preceding stage via the buffer modules 40, execution of its own image processing becomes possible after the image processings of all of the plural image processing modules 38 at the preceding stage end.

Figure 2B:
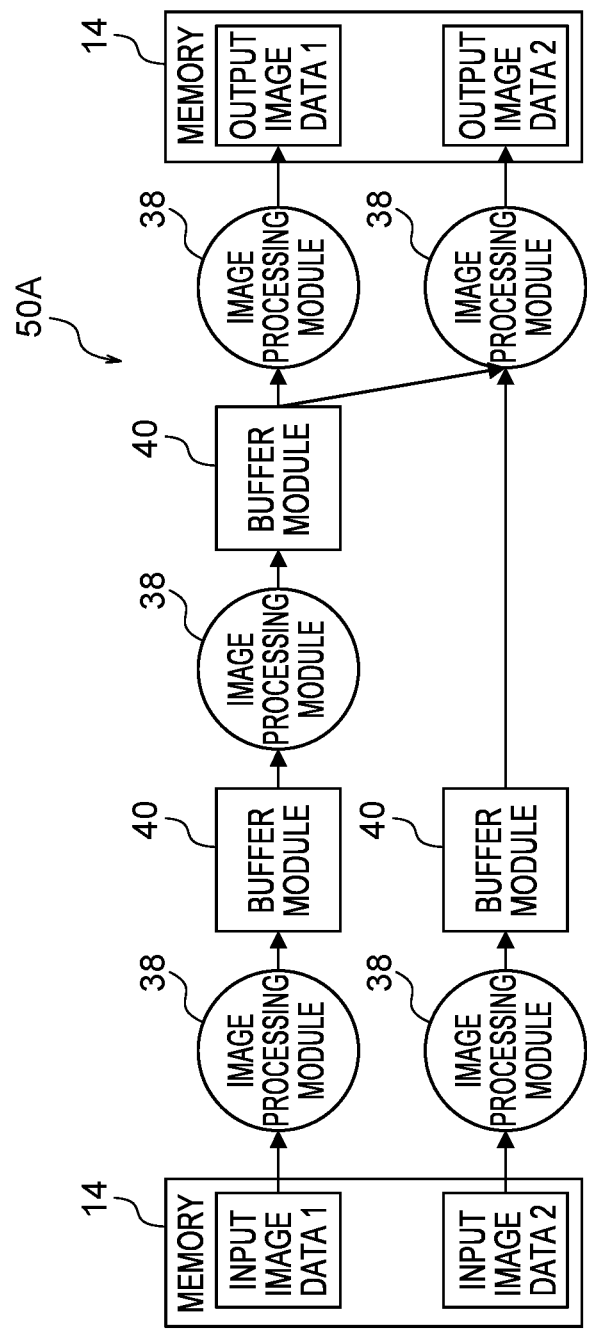
FIG. 2B is a schematic drawing illustrating an example in which a memory for input/output is added to the image processing DAG.

Further, FIG. 2A illustrates a DAG in which only the respective modules are connected in the order of processing. However, when this DAG is executed, as illustrated in FIG. 2B, the input image data that is stored in the memory 14 is input, and image processing is carried out in accordance with the DAG. Then, finally, the results of processing, such as the output image data that has been subjected to processing, are stored in the memory 14.

Figure 3:
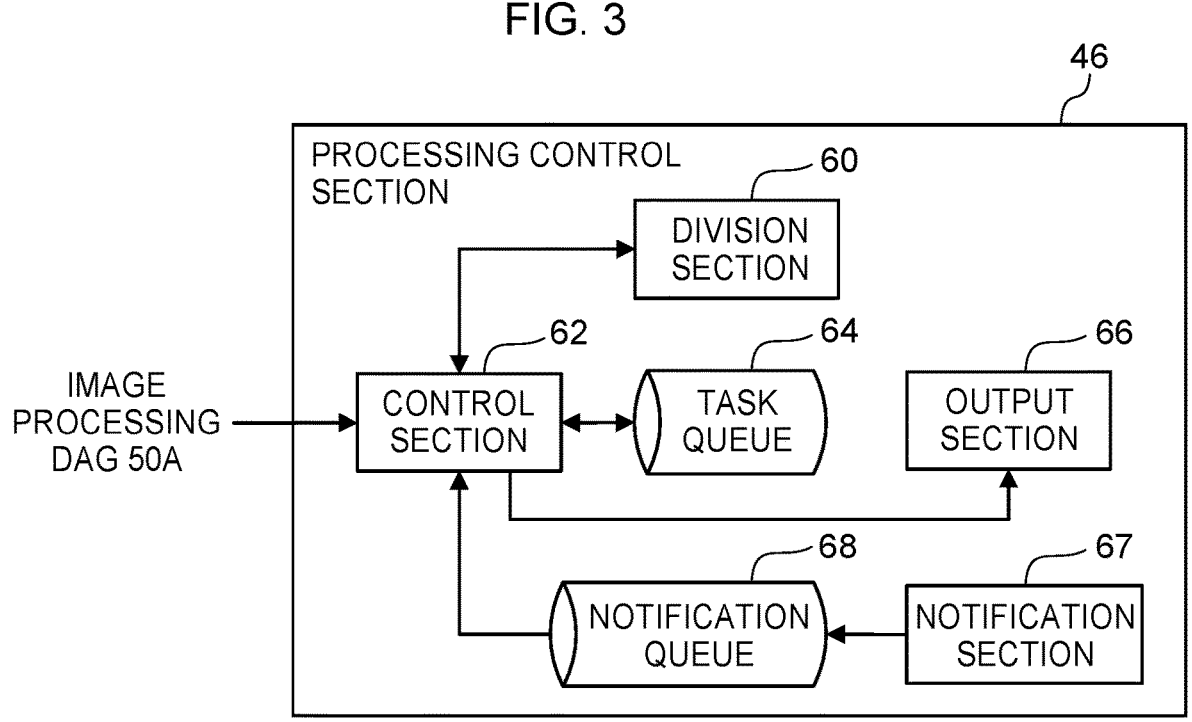
FIG. 3 is a block drawing illustrating an example of functional structures of a processing control section relating to the embodiment.

Functional structures of the processing control section 46 relating to the present embodiment are described next with reference to FIG. 3. As illustrated in FIG. 3, the processing control section 46 includes a division section 60, a control section 62, a task queue 64, an output section 66, a notification section 67, and a notification queue 68.

Figure 4A:
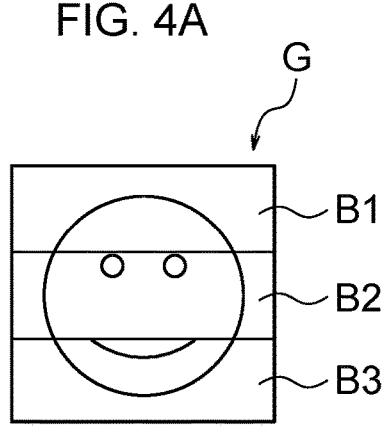
FIG. 4A is a schematic drawing for explanation of an example of dividing processing of an input image.

The division section 60 relating to the present embodiment divides the image that is expressed by the portion, which is the object of processing, of the input image data into plural partial regions (hereinafter referred to as "divisional images"). For example, as illustrated in FIG. 4A, the division section 60 divides image G that is expressed by the portion, which is the object of processing, of the input image data into plural (three in the example illustrated in FIG. 4A) divisional images B1 through B3. Hereinafter, the image data expressing the divisional images are referred to as "divisional image data".

In an image processing that uses the entire input image as its object of processing such as color conversion processing, the portion, which is the object of processing, of the input image data refers to the entire input image data. Further, in an image processing that uses a portion of the input image as its object of processing such as in cutting (trimming) processing, the portion, which is the object of processing, of the input image data refers to a corresponding portion of the input image data. Hereinafter, the portion, which is the object of processing, of the input image data is simply referred to as the "input image data".

Figure 4B:
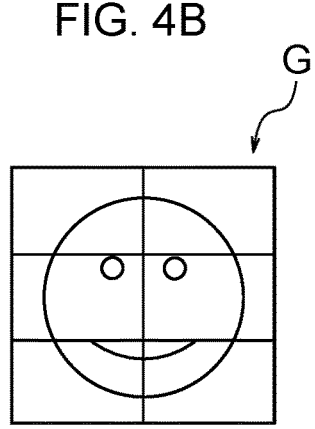
FIG. 4B is a schematic drawing for explanation of an example of dividing processing of an input image.

Further, in the example illustrated in FIG. 4A, the division section 60 divides the image G into plural pieces in vertical positions when seen in a front view, but the dividing is not limited to this. For example, the division section 60 may divide the image G into plural pieces from left to right when seen in a front view, or, as illustrated in FIG. 4B, the division section 60 may divide the image G vertically and left to right when seen in a front view.

Note that the number of divisions of the input image data by the division section 60 is not particularly limited. For example, the division section 60 may divide the input image data by a predetermined number or into a predetermined size. For example, the division section 60 may divide the input image data into a number that is greater than or equal to two and is less than or equal to the number of processor cores of the computing section at which the image processing by the image processing module 38 is executed.

The division section 60 may alternatively divide the input image data into a size that is less than or equal to the capacity of the cache memory of the computing section at which the image processing by the image processing module 38 is executed. In this case, for example, the division section 60 may divide the input image data into a size that is less than or equal to the capacity of the cache memory of the level that is furthest from the processor of the computing section at which the image processing by the image processing module 38 is executed, i.e., the capacity of the Last Level Cache (LLC), and a size that approaches the capacity of the LLC as much as possible.

The image data supplying section 22 relating to the present embodiment supplies information relating to the image data, such as the size of the image data (e.g., the numbers of vertical and horizontal pixels, or the like) and the data capacity, before supplying the image data. After supplying the information relating to the image data, the image data supplying section 22 starts the supplying of the image data. In this regard, the image data supplying section 22 supplies the image data sequentially in accordance with a predetermined order, such as an order from the top left pixel to the bottom right pixel of the image expressed by the image data, or the like. Accordingly, the division section 60 relating to the present embodiment may divide the image data on the basis of the information relating to the image data, even if not all the image data that is the object of processing has been supplied from the image data supplying section 22.

The control section 62 relating to the present embodiment carries out control that causes the plural cores 13 to execute, in parallel, the tasks corresponding to the respective items of the divisional image data. Note that in parallel here means that tasks, which have become executable based on their relationships of dependence, are executed in parallel (i.e., simultaneously) by the plural cores 13.

Figure 5:
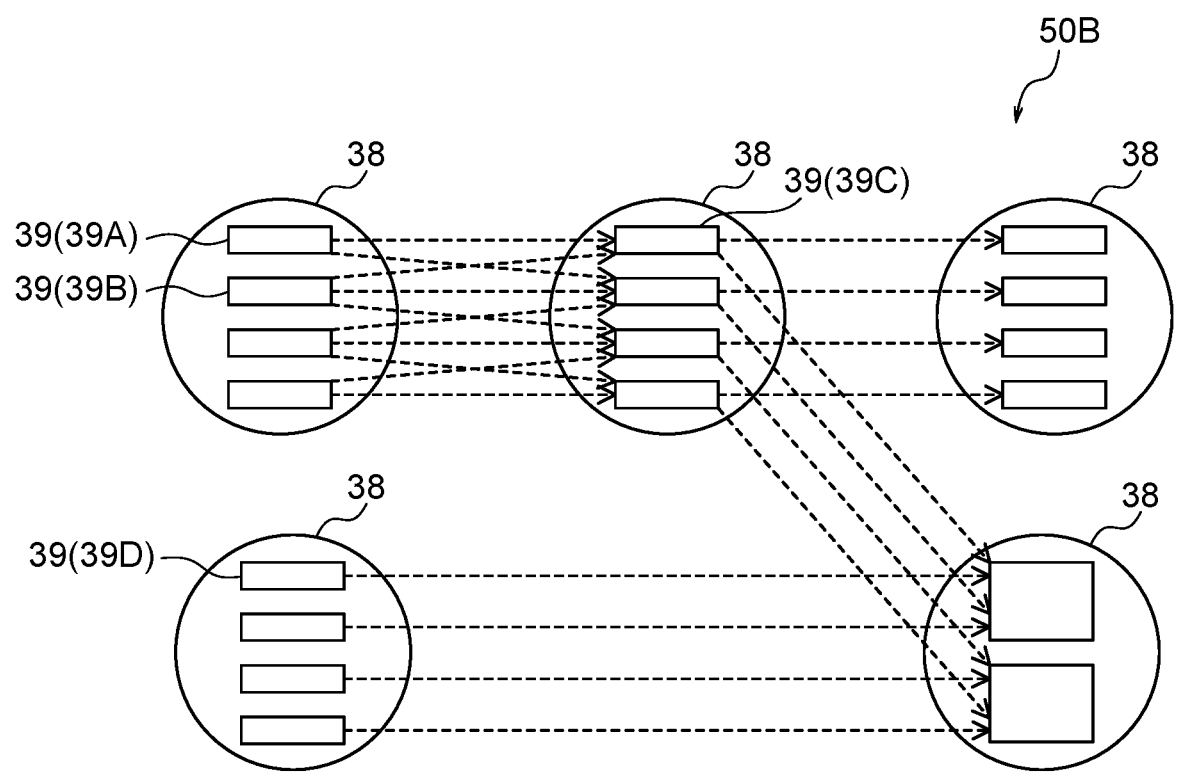
FIG. 5 is a schematic drawing illustrating an example of an image processing DAG in which image processing modules have been divided into partial processing routines.

Specifically, as illustrated as an example in FIG. 5, the control section 62 divides the image processings, which are to be executed by the respective image processing modules 38 of the image processing DAG 50A, into partial processings (i.e., partial processing routines) 39 that respectively correspond to the items of the divisional image data (i.e., the divisional data obtained by the dividing by the division section 60), and updates the image processing DAG 50A to an image processing DAG 50B. Note that the image processing DAG 50B illustrates a DAG of the tasks of the respective partial processings 39, which is referred to as a task DAG.

FIG. 5 illustrates the image processing DAG 50B in a case in which, in the image processing DAG 50A illustrated in FIG. 2A, the input image data is divided into four items of divisional image data.

The control section 62 relating to the present embodiment gives relationships of dependence between the partial processings 39 of the image processing module 38 that is connected at the preceding stage, and the partial processings 39 of the image processing module 38 that is connected at the subsequent stage, in accordance with the types of image processings that are executed at the image processing modules 38. Note that the relationships of dependence are illustrated by the arrows in FIG. 5.

For example, the processing that performs the image processing only on the pixel that is the object of processing, such as color conversion processing, has a one-to-one relationship of dependence at each of the partial processings 39 as well. However, in an image processing that also requires the surrounding pixels of the pixel that is the object of processing, such as filtering processing for example, a relationship of dependence is given also to the partial processing 39 of the preceding stage that carries out the image processing on the surrounding pixels. Namely, this relationship of dependence is a relationship such that, among the image processing modules 38 that are mutually connected, the partial processing 39 of the image processing module 38 that is connected at the subsequent stage becomes executable after the partial processing 39 of the image processing module 38 that is connected at the preceding stage is finished. Accordingly, each partial processing 39 becomes executable either in a case in which there is no partial processing 39 for which a relationship of dependence has been given at the preceding stage, or in a case in which all of the partial processings 39 of the preceding stage, to which relationships of dependence have been given, are finished.

Specifically, for example, partial processings 39A, 39B, 39D illustrated in FIG. 5 are executable at the time of the start of execution of image processing. Further, for example, partial processing 39C illustrated in FIG. 5 becomes executable after both the partial processing 39A and the partial processing 39B, which are at the preceding stage and to which relationships of dependence have been given, are finished.

Note that, in the present embodiment, the partial processing 39 that corresponds to the item of the divisional image data is referred to as a "task".

The control section 62 stores tasks that are executable in the task queue 64 that is for the respective plural cores 13 to successively read-out and execute the stored tasks. Note that, as an example, the number of tasks that the control section 62 of the present embodiment simultaneously stores in the task queue 64 is two or fewer. The task queue 64 relating to the present embodiment is a queue that can be referenced by the respective cores 13.

Note that the number of tasks that are simultaneously stored in the task queue 64 is not limited to that of the present embodiment, and is preferably two or more. In a case in which only one task is stored in the task queue 64, assuming that a new task is not stored in the task queue until execution of the task is completed, the new task is not stored in the task queue 64, and, among the plural cores 13, the number of the cores 13 that are not operating increases, and the utilization ratio of the cores 13 decreases. On the other hand, if the number of tasks that can be simultaneously stored in the task queue 64 is not limited, since memory is ensured for all of the tasks that are stored in the task queue 64 in the pre-processing (details of which are described later), the memory capacity that is ensured becomes large.

Accordingly, by limiting the number of tasks that can be simultaneously stored in the task queue 64, an increase in the amount of resources, such as the memory and the like, that are ensured in the pre-processing is suppressed. Therefore, the number of tasks that the task queue 64 can store simultaneously may be determined in accordance with the capacity of the memory and the like, or may be made to be variable in accordance with the utilization ratio of the cores 13.

The control section 62 acquires a task from the task queue 64, and executes the acquired task. After execution of the task, the control section 62 updates the dependencies of FIG. 5, and, if there is a task that has newly become executable, generates a task, and stores the generated task in the task queue 64.

In the example of FIG. 5, in a case in which completion of storage is not confirmed for each item of the divisional image data, if all the image data (i.e., input image data 1, 2 in the example of FIG. 2B) are stored in advance in a predetermined storage area (i.e., the memory 14 in the example of FIG. 2B) within the computer 10, the tasks of the most preceding stage such as the partial processings 39A, 39B, 39D are executable at the time of the start of execution of the image processing. Note that what is referred to as a task of the most preceding stage here means a task at which there is no task with a relationship of dependence at its preceding stage. Further, hereinafter, when a "storage area" is simply described, it means the aforementioned predetermined storage area within the computer 10.

There may be a case in which supplying of all the image data from the image data supplying section 22 has not been completed at the time of the start of execution of the image processing, or a case in which storing of all the image data in a storage area (e.g., the memory 14 and the local memory 15 and the like) is difficult due to memory constraints in the execution environment. Namely, there may be a case in which, even though not all the image data is stored in the storage area, some items of divisional image data are stored in the storage area. Thus, for a task for which storage of a corresponding item of the divisional image data, which is the object of processing of the task, in the storage area has been completed, the control section 62 relating to the present embodiment judges that the task is executable, and stores the task in the task queue 64.

On the other hand, for a task for which storage of a corresponding item of divisional image data, which is the object of processing of the task, in the storage area has not been completed, the control section 62 does not judge that task to be executable.

Further, in a case in which there no executable task in the tasks of the most preceding stage, and notification information that is described later is not stored in the notification queue 68, the control section 62 transitions to a sleep state. In a case in which notification information is stored in the notification queue 68 during the state in which the control section 62 has transitioned to the sleep state, the control section 62 transitions to an active state. Note that the task queue 64 relating to the present embodiment is a queue that can be referenced by the core 13 that functions as the control section 62.

In a case in which an item of the divisional image data, which has been obtained by the division of the image data that is the object of processing, is stored in the storage area that is the storage destination of the image data, the notification section 67 relating to the present embodiment notifies the control section 62 that the item of the divisional image data has been stored.

Specifically, in a case in which storage of an item of the divisional image data in the storage area has been completed, the notification section 67 notifies the control section that the item of the divisional image data have been stored, by storing, in the notification queue 68, notification information that expresses that the item of the divisional image data have been stored. The notification section 67 carries out this notification on the basis of, for example, accumulation information that includes identification information of the image data that is the object of processing, the address of the storage area, the data capacity up until the portion where storage of the image data in the storage area is completed, and the like. The notification section 67 carries out the above-described notification for each of the tasks of the most preceding stage of the image processing DAG 50B.

The output section 66 relating to the present embodiment outputs, under control of the control section 62, the output image data that is obtained as a result of the image processing executed by the image processing module 38 of the final stage of the image processing DAG 50B. In the present embodiment, the output section 66 displays, on the display section 16, an output image that is expressed by the obtained output image data. Note that the output section 66 may output (or transmit) the output image data to an external device. Further, in a case in which the computer 10 is built-into a printer, the output section may output (or form) the output image, which is expressed by the output image data, on a recording material such as paper.

Figure 6:
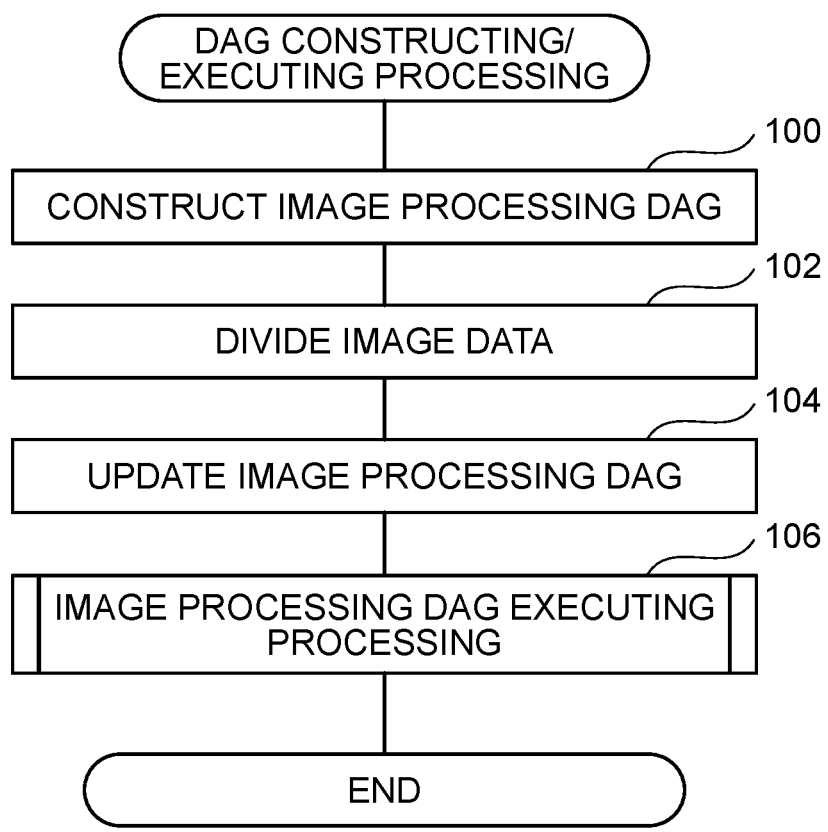
FIG. 6 is a flowchart illustrating an example of the flow of DAG constructing/executing processing relating to the embodiment.

Operation of the computer 10 relating to the present embodiment is described next with reference to FIG. 6 through FIG. 11. FIG. 6 is a flowchart illustrating the flow of DAG constructing/executing processing that is executed by the first computing section 12A in a case in which an instruction to start execution of image processing is input from the application 32. The program of the DAG constructing/executing processing (the DAG constructing/executing processing program) is installed in the storage 20 in advance. Further, due to a core 13, which is not executing any task at the first computing section 12A and which can execute a task, executing the DAG constructing/executing processing program, the core 13 functions as the above-described processing constructing section 42, division section 60 and control section 62.

In step 100 of FIG. 6, the processing constructing section 42 constructs the image processing DAG 50A, which carries out the image processing instructed by the application 32, in accordance with a constructing instruction from the application 32. In step 102, as described above, the division section 60 divides the image that is expressed by the portion, which is the object of processing, of the input image data into plural divisional images on the basis of the information relating to the image data that is supplied from the image data supplying section 22.

In step 104, as described above, the processing constructing section 42 divides the image processing DAG 50A that has been constructed in step 100 into the partial processings 39 that correspond to the respective items of the divisional image data obtained by the dividing in step 102, and updates the image processing DAG 50A to the image processing DAG 50B.

In step 106, the control section 62 and the processing constructing section 42 execute image processing DAG execution processing that causes the first computing section 12A (i.e., the cores 13) and the second computing section 12B to execute the image processing in accordance with the image processing DAG 50B that has been updated in step 104, and thereafter, ends the present DAG constructing/executing processing.

Due to the present DAG constructing/executing processing being executed, the results of the image processing that the application 32 desires are obtained from the output section 66. Note that, in the present embodiment, in a case in which the present DAG constructing/executing processing ends, the control section 62 outputs information expressing that processing is completed, or, in a case in which some type of error arises during processing, the control section 62 notifies the application 32 of information that expresses that fact.

The image processing DAG executing processing in step 106 of the above-described DAG constructing/executing processing is described in detail next. The image processing DAG executing processing relating to the present embodiment includes task storing processing that stores an executable task of the image processing DAG 50B in the task queue 64, and task executing processing that executes the task stored in the task queue 64. Moreover, the DAG constructing/executing processing relating to the present embodiment includes notification processing that gives notice that an item of the divisional image data that is the object of processing has been stored in the storage area. Further, the task storing processing includes first task storing processing that is executed on the task of the most preceding stage of the image processing DAG 50B, and second task storing processing that is executed on the tasks from the second stage and thereafter of the image processing DAG 50B.

Figure 7:
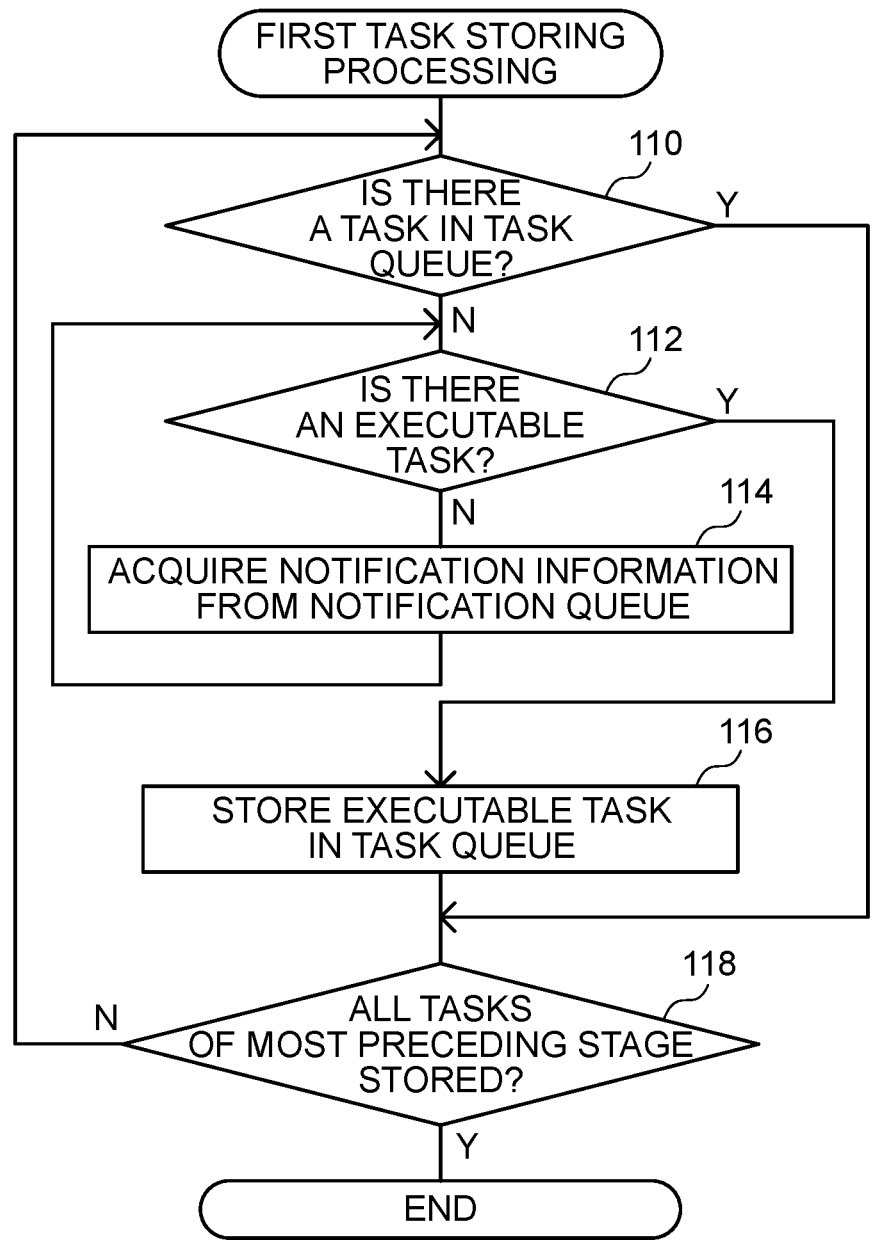
FIG. 7 is a flowchart illustrating an example of the flow of first task storing processing relating to the embodiment.

The first task storing processing is described with reference to FIG. 7. FIG. 7 is a flowchart illustrating the flow of the first task storing processing. In the present embodiment, the program of the first task storing processing (i.e., the first task storing processing program) is installed in advance in the storage 20 as a portion of the DAG constructing/executing processing program, or as a sub-program that is separate therefrom. Due to a core 13, which is not executing any task at the first computing section 12A and which can execute a task, executing the first task storing processing program, the core 13 functions as the control section 62, and executes the first task storing processing that is illustrated in FIG. 7.

In step 110 of FIG. 7, the control section 62 judges whether or not an executable task is stored in the task queue 64. In the present embodiment, in a case in which there are two or more executable tasks stored in the task queue 64, the judgment in step 110 is affirmative and processing moves on to step 118. However, in a case in which there are fewer than two executable tasks stored in the task queue 64, the judgement of step 110 is negative and processing moves on to step 112.

In step 112, the control section 62 judges whether or not there is an executable task in the tasks of the most preceding stage of the image processing DAG 50B. Specifically, in a case in which there is a task, for which a corresponding item of the divisional image data that is the object of processing is stored in the storage area, in the tasks of the most preceding stage of the image processing DAG 50B, the control section 62 judges that the task to be an executable task. In a case in which this judgment is affirmative, processing moves on to step 116, and, in a case in which this judgement is negative, processing moves on to step 114.

Figure 11:
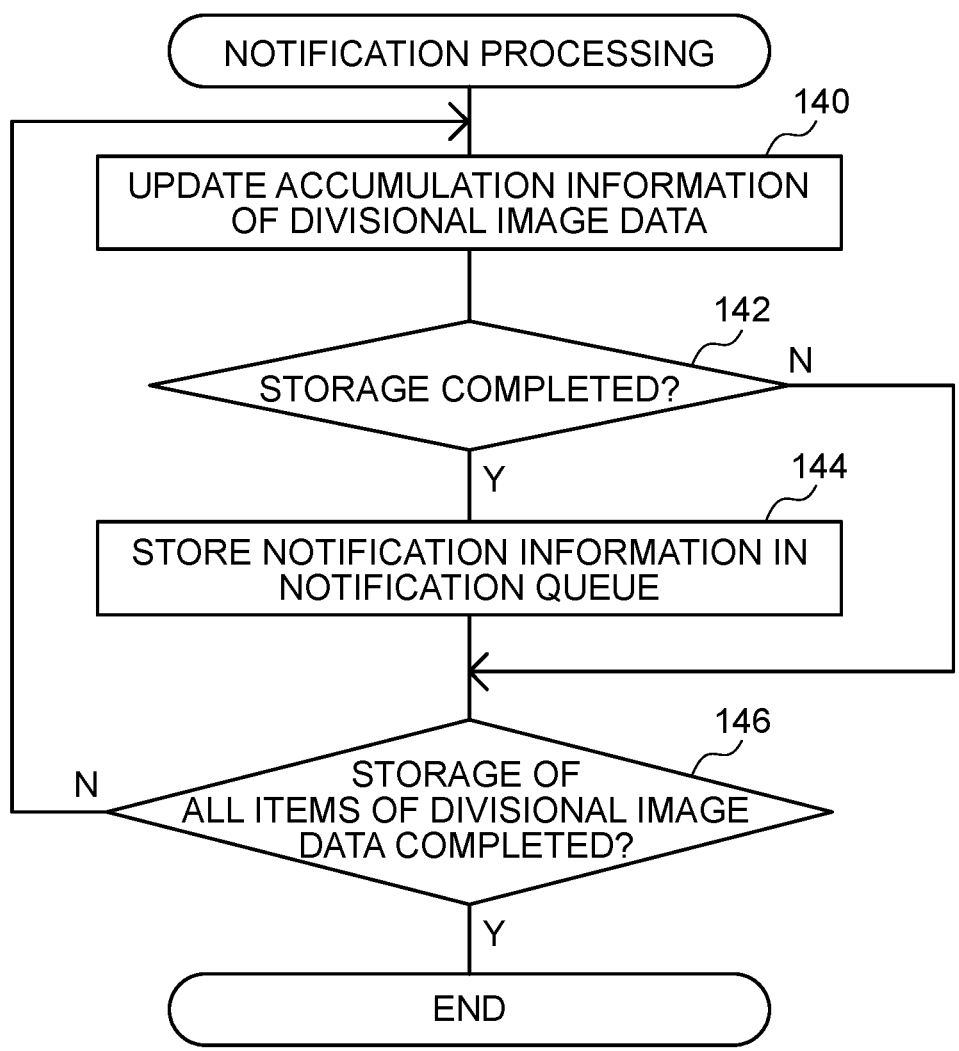
FIG. 11 is a flowchart illustrating an example of the flow of notification processing relating to the embodiment.

In step 114, the control section 62 acquires notification information from the notification queue 68. This acquiring processing is a synchronous processing (or a blocking processing) and, the control section 62 transitions to a sleep state in which it continues to standby until the notification information can be acquired, i.e., until the notification information is stored in the notification queue 68. Note that, alternatively, the control section 62 may continue looping until notification information is stored in the notification queue 68, without continuing to standby in the synchronous processing. This processing of continuing looping is generally referred to as busy waiting or spin locking. However, it is preferable for the control section 62 to continue to standby in the synchronous processing, rather than to continue looping since the consumed amount of the computing resources at the overall system can be reduced. This notification information is stored in the notification queue 68 by the processing of step 144 of the notification processing that is illustrated in FIG. 11 and is described later.

After notification information is stored in the notification queue 68, the control section 62 transitions from the sleep state to the active state, and the processing returns to step 112. Note that the reason why processing returns to step 112 and does not move on to step 116 after the control section 62 transitions to the active state is as follows. This is because, in a case in which the first task storing processing is carried out at the plural cores 13, at the time when the control section 62 transitions to the active state in step 114 after notification information is stored in the notification queue 68, there may be a possibility that the first task storing processing is carried out at another core 13 (thread) at the same time, and a state may arise in which there are no executable tasks.

Figure 8:
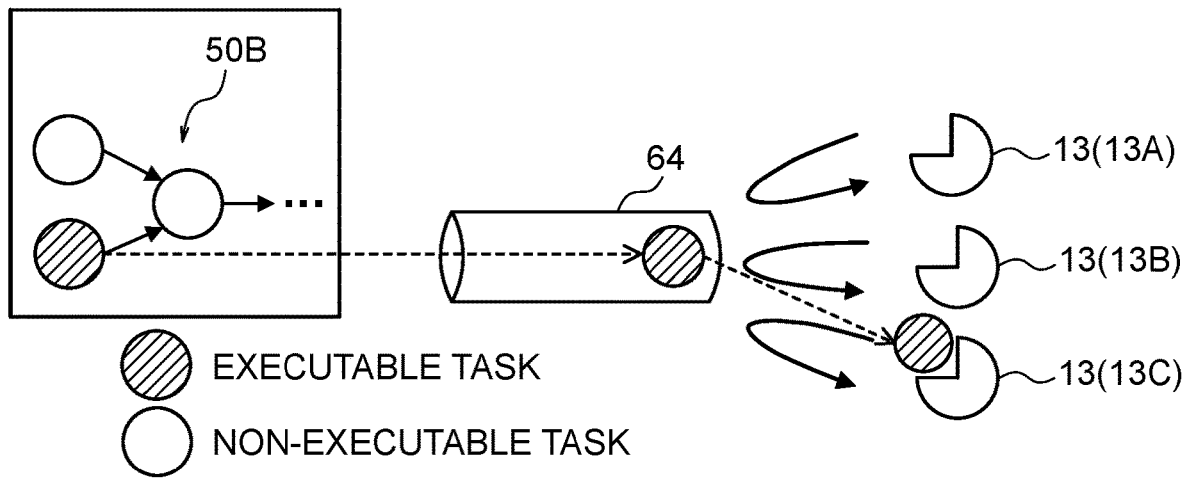
FIG. 8 is a schematic drawing that is provided for explanation of storing processing of a task into a task queue relating to the embodiment.

In step 116, as illustrated in FIG. 8 as an example, the control section 62 stores an executable task in the task queue 64. In the example of FIG. 8, a state in which the control section 62 has stored an executable task in the task queue 64 is illustrated. Further, in the example of FIG. 8, among the core 13A through the core 13C, the core 13C acquires the task that is stored in the task queue 64, and executes the acquired task. Details of the processing of executing a task are described hereafter by using FIG. 10.

Note that, at this time, as described above, it suffices for the number of tasks that are stored in the task queue 64 to be two or fewer. In present step 116, the number of tasks that the control section 62 simultaneously stores in the task queue 64 may be one, or may be two. Specifically, in a case in which no task is stored in the task queue 64, it suffices for the control section 62 to store one or two tasks, and, in a case in which one task is stored in the task queue 64, it suffices for one task to be stored in the task queue 64. The number of tasks the control section 62 is to simultaneously store in the task queue 64 in present step 116 may be determined in advance, or may be variable in accordance with the progress of the task processings at the respective cores 13.

In step 118, the control section 62 judges whether or not all of the tasks of the most preceding stage of the image processing DAG 50B are stored in the task queue 64. In a case in which this judgement is negative, the processing returns to step 110, and, in a case in which this judgement is affirmative, the present first task storing processing ends.

Figure 9:
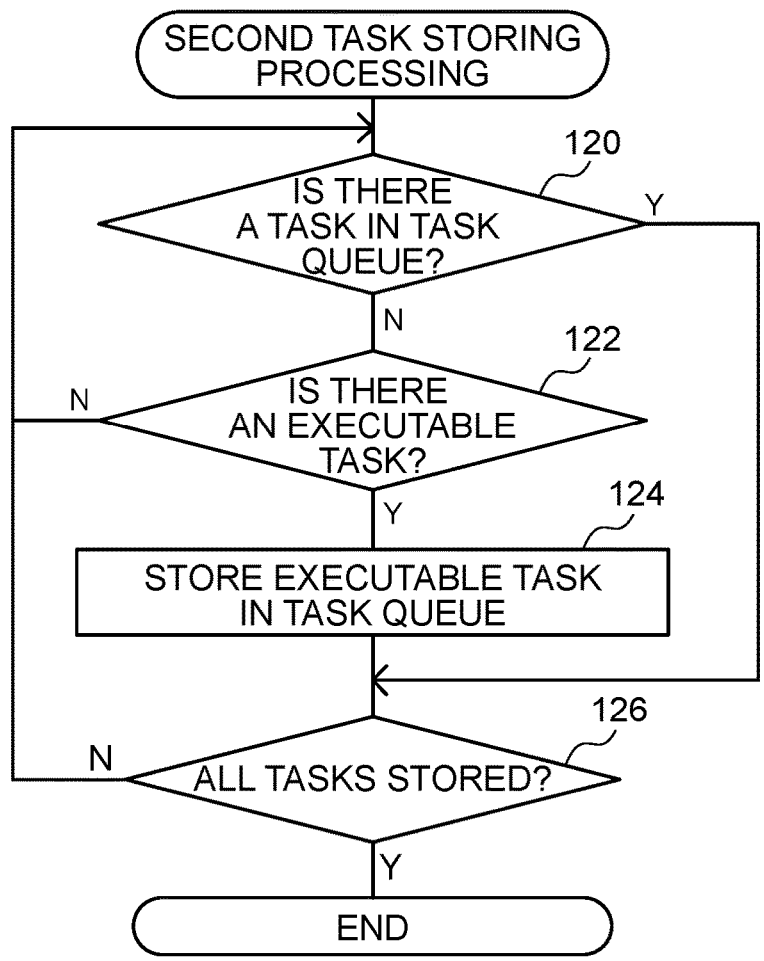
FIG. 9 is a flowchart illustrating an example of the flow of second task storing processing relating to the embodiment.

The second task storing processing is described with reference to FIG. 9. FIG. 9 is a flowchart illustrating the flow of the second task storing processing. In the present embodiment, the program of the second task storing processing (i.e., the second task storing processing program) is installed in advance in the storage 20 as a portion of the DAG constructing/executing processing program, or as a sub-program that is separate therefrom. Due a core 13, which is not executing any task at the first computing section 12 and which can execute a task, executing the second task storing processing program, the core 13 functions as the control section 62, and executes the second task storing processing that is illustrated in FIG. 9.

In step 120 of FIG. 9, the control section 62 judges whether or not an executable task is stored in the task queue 64. In the present embodiment, in a case in which there are two or more executable tasks that are stored in the task queue 64, the judgment in step 120 is affirmative, and processing moves on to step 126. Further, in a case in which the number of executable tasks that are stored in the task queue 64 is less than two, the judgment of step 120 is negative, and processing moves on to step 122.

In step 122, the control section 62 judges whether or not there is an executable task in the tasks of the second stage or thereafter of the image processing DAG 50B. Specifically, in a case in which there is a task, for which all of the tasks of the preceding stages to which a relationship of dependence has been given are finished, in the tasks of the second stage or thereafter of the image processing DAG 50B, the control section 62 judges that that task is an executable task. In a case in which this judgment is negative, processing returns to step 120, and, in a case in which this judgment is affirmative, processing moves on to step 124.

In step 124, the control section 62 stores the task, which was judged in step 122 to be executable, in the task queue 64. Note that, at this time, in the same way as in step 116, it suffices for the number of tasks that are stored in the task queue 64 to be two or less.

In step 126, the control section 62 judges whether or not all of the tasks that are of the second stage and thereafter of the image processing DAG 50B have been stored in the task queue 64. In a case in which this judgement is negative, processing returns to step 120, and, in a case in which this judgement is affirmative, the present second task storing processing ends.

Figure 10:
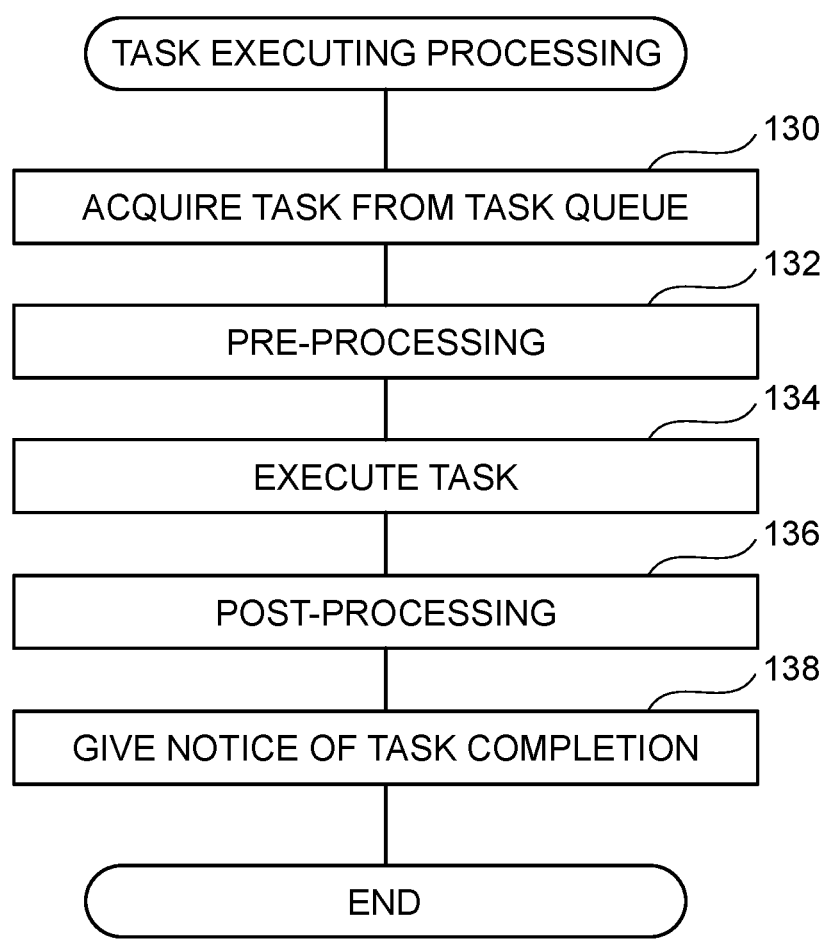
FIG. 10 is a flowchart illustrating an example of the flow of task executing processing relating to the embodiment.

Task executing processing is described next with reference to FIG. 10. FIG. 10 is a flowchart illustrating the flow of the task executing processing. In the present embodiment, the program of the task executing processing (i.e., the task executing processing program) is installed in the storage 20 in advance as a portion of the DAG constructing/executing processing program, or as a sub-program that is separate therefrom.

Due to each of the cores 13, which are not executing any tasks at the first computing section 12A and which can execute tasks, executing the task executing processing program, the core 13 functions as the control section 62, and executes the task executing processing that is illustrated in FIG. 10. Note that, in the present embodiment, the task storing processing and the task executing processing are executed in parallel due to the above-described task storing processing and the task executing processing being executed by different cores 13.

In step 130 of FIG. 10, the control section 62 acquires a task from the task queue 64. In step 132, the control section 62 executes a predetermined pre-processing in the execution of the task. This pre-processing is a processing that is determined in advance to be carried out before the image processing, and is not particularly limited. For example, the pre-processing includes processing that carries out allocating an output buffer area for storing the image processing results, allocating resources for computing such as the initialization of variables for the image processing, and the like.

In step 134, the control section 62 causes the core 13 of the first computing section 12A (e.g., the core 13 that is operating as the control section 62 itself) or the second computing section 12B to execute the task acquired in step 130. Note that, in a case in which the second computing section 12B is made to execute the task, due to the core 13 of the first computing section 12A carrying out the processing of causing the second computing section 12B to execute the task, the task is executed by the second computing section 12B.

Further, information, which indicates whether or not the task is a task that is executed at the second computing section 12B, is imparted at the time when, for example, the processing constructing section 42 updates the image processing DAG 50A to the image processing DAG 50B in step 104 of the DAG constructing/executing processing of FIG. 6.

In step 136, the control section 62 carries out a predetermined post-processing in the execution of the task. This post-processing is a processing that is determined in advance to be carried out after the partial processing corresponding to the task, and is not particularly limited. For example, the post-processing includes processing of releasing the resources for computing that have been allocated by the processing of step 132, or the like.

In step 138, the control section 62 gives the processing constructing section 42 notice of completion of the task. The processing constructing section 42, which has received the task completion notification, updates the relationships of dependence of the image processing DAG 50B. After the processing of step 138 ends, the present task executing processing ends.

Notification processing is described next with reference to FIG. 11. FIG. 11 is a flowchart illustrating the flow of the notification processing. In the present embodiment, the program of the notification processing (i.e., the notification processing program) is installed in the storage 20 in advance as a portion of the DAG constructing/executing processing program, or as a sub-program that is separate therefrom. Due to a core 13, which is not executing any task at the first computing section 12A and which can execute a task, executing the notification processing program, the core 13 functions as the notification section 67, and executes the notification processing that is illustrated in FIG. 11.

In step 140, the notification section 67 updates accumulation information that indicates the state of accumulating, in the storage area, image data that is the object of processing of a task of the most preceding stage of the image processing DAG 50B. As described above, the accumulation information includes identification information of the image data that is the object of processing, the address of the storage area, the data capacity up until the portion where storage of the image data in the storage area is completed, and the like. The notification section 67 monitors the state of the supplying of image data from the image data supplying section 22, and updates the accumulation information.

In step 142, on the basis of the accumulation information that has been updated in step 140, the notification section 67 judges whether or not there is an item of the divisional image data, for which storage in the storage area has newly been completed, in the items of the divisional image data that are the objects of processing of a task of the most preceding stage of the image processing DAG 50B. In a case in which this judgment is negative, processing moves on to step 146, and, in a case in which this judgment is affirmative, processing moves on to step 144.

In step 144, the notification section 67 stores the notification information in the notification queue 68. In step 146, the notification section 67 judges whether or not storing, in the storage area, of all items of the divisional image data that are the objects of processing of a task of the most prior stage of the image processing DAG 50B, has been completed. In a case in which this judgement is negative, processing returns to step 140, and, in a case in which this judgment is affirmative, the present notification processing ends.

As described above, in accordance with the present embodiment, in a case in which an item of the divisional image data that corresponds to a task (i.e., the partial processing 39) is stored in the storage area, the control section 62 is notified that the item of the divisional image data is stored in the storage area. Accordingly, the control section 62 does not standby until all the image data is stored in the storage area, and, for each task, image processing is started each time the corresponding item of the divisional image data that is the object of processing is stored in the storage area. As a result, the overall processing time of the image processing may be shortened.

Further, in accordance with the present embodiment, the above described notification is carried out by the notification information, which indicates that an item of the divisional image data has been stored in the storage area, being stored in the notification queue 68 that the control section 62 can reference. Accordingly, even in a case in which any of the cores 13 executes the first task storing processing, the core 13 that executes the notification processing may notify the core 13, which executes the first task storing processing, that the item of the divisional image data has been stored in the storage area.

Further, in accordance with the present embodiment, in a case in which there is no executable task of the most preceding stage, and notification information is not stored in the notification queue 68, the control section 62 transitions to the sleep state. Then, in a case in which notification information is stored in the notification queue 68 during the state in which the control section 62 has transitioned to the sleep state, the control section 62 transitions to the active state. Accordingly, the consumed amount of the computing resources of the entire system may be reduced.

Note that, although the above-described embodiment describes a case in which the fact that an item of the divisional image data has been stored in the storage area is notified via the notification queue 68, the present disclosure is not limited to this. For example, there may be a form in which the fact that an item of the divisional image data has been stored in the storage area is notified via communication between the cores 13 or a flag file or the like.

Further, in the above-described embodiment, for example, the various processors listed hereinafter may be used as the hardware structures of the processing sections (or processing units) such as the division section 60, the control section 62, the output section 66 and the notification section 67, which execute the various processings. The aforementioned various processors may include, in addition to CPUs that are general purpose processors that execute software (or programs) and function as various processing sections as described above, Programmable Logic Devices (PLDs) that are processors whose circuit structures may be changed after production, such as FPGAs or the like, or dedicated electric circuits that are processors having circuit structures that are designed exclusively for executing specific processings such as Application Specific Integrated Circuits (ASICs) and the like.

One processing section may be configured by one of these various processors, or may be configured by a combination of two or more of the same type or different types of these processors (e.g., a combination of plural FPGAs, or a combination of a CPU and an FPGA). Further, plural processing sections may be configured by a single processor.

As examples of configuring plural processing sections by a single processor, a first exemplary configuration may be configuring one processor by a combination of one or more CPUs and software, and this processor functions as plural processing sections, as typified by computers such as a client and a server. A second exemplary configuration may be using a processor that realizes the functions of the entire system including plural processing sections, by a single Integrated Circuit (IC) chip, as typified by a System On Chip (SoC) or the like. In this way, the various processing sections are configured by using one or more of the above-described various processors as the hardware structures.

Moreover, as the hardware structures of these various processors, more specifically, electrical circuits (or circuitry) that combine circuit elements such as semiconductor elements and the like may be used.

Further, the above-described embodiment describes an aspect in which the various programs are stored (or installed) in advance in the storage 20, but the present disclosure is not limited to this. The various programs may be provided and distributed in a form of being recorded on a recording medium such as a CD-ROM, a Digital Versatile Disk Read Only Memory (DVD-ROM), a Universal Serial Bus (USB) memory, or the like. Further, the various programs may be provided or distributed in forms such that they are downloaded from an external device via a network.

What is claimed is:

1. An image processing device configured to execute image processing, using respective objects of an object group in which a plurality of objects configured to execute image processing are connected in a form of a directed acyclic graph, the image processing device comprising a processor configured to:

divide image data, which is an object of the image processing, into a plurality of items of divisional image data;

effect control to cause a plurality of arithmetic devices to execute, in parallel, respective partial processing routines, each of the partial processing routines comprising image processing to be carried out on a corresponding item of the divisional image data that is stored in a predetermined storage area; and in a case in which an item of divisional image data that corresponds to a partial processing routine is stored in the storage area, notify that the item of divisional image data has been stored in the storage area, wherein the processor is configured to control the plurality of arithmetic devices to start an execution of the image processing on the corresponding item of the divisional image data each time the corresponding item of the divisional image data has been stored in the storage area, wherein the processor carries out the notification by storing, in a notification queue that is configured to be referenced processor, notification information that indicates that the item of divisional image data has been stored in the storage area.

2. The image processing device of claim 1, wherein, in a case in which there is no partial processing routine that is executable and the notification information is not stored in the notification queue, the processor transitions to a sleep state, and, in a case in which the notification information is stored in the notification queue during a state in which the processor has transitioned to the sleep state, the processor transitions to an active state and effects the control.

3. The image processing device of claim 1, wherein the processor effects the control by storing a partial processing routine that is executable, in a task queue that is configured to be referenced by the plurality of arithmetic devices.

4. An image processing method executed by an image processing device comprising a processor configured to execute image processing using respective objects of an object group in which a plurality of objects configured to execute image processing are connected in a form of a directed acyclic graph, the image processing method comprising:

dividing image data, which is an object of the image processing, into a plurality of items of divisional image data;

effecting control to cause a plurality of arithmetic devices to execute, in parallel, respective partial processing routines, each of the partial processing routines comprising image processing to be carried out on a corresponding item of the divisional image data that is stored in a predetermined storage area; and in a case in which an item of divisional image data that corresponds to a partial processing routine is stored in the storage area, notifying that the item of divisional image data has been stored in the storage area, wherein the processor is configured to control the plurality of arithmetic devices to start an execution of the image processing on the corresponding item of the divisional image data each time the corresponding item of the divisional image data has been stored in the storage area, wherein the notifying is performed by storing, in a notification queue that is configured to be referenced, notification information that indicates that the item of divisional image data has been stored in the storage area.

5. The image processing method of claim 4, wherein, in a case in which there is no partial processing routine that is executable and the notification information is not stored in the notification queue, the processor transitions to a sleep state, and, in a case in which the notification information is stored in the notification queue during a state in which the processor has transitioned to the sleep state, the processor transitions to an active state and effects the control.

6. The image processing method of claim 4, wherein the processor effects the control by storing a partial processing routine that is executable in a task queue that is configured to be referenced by the plurality of arithmetic devices.

7. A non-transitory storage medium storing a program that causes a computer to execute image processing using respective objects of an object group in which a plurality of objects configured to execute image processing are connected in a form of a directed acyclic graph, the image processing comprising:

dividing image data, which is an object of the image processing, into a plurality of items of divisional image data;

effecting control to cause a plurality of arithmetic devices to execute, in parallel, respective partial processing routines, each of the partial processing routines comprising image processing to be carried out on a corresponding item of the divisional image data that is stored in a predetermined storage area; and in a case in which an item of divisional image data that corresponds to a partial processing routine is stored in the storage area, notifying that the item of divisional image data has been stored in the storage area, wherein the computer is configured to control the plurality of arithmetic devices to start an execution of the image processing on the corresponding item of the divisional image data each time the corresponding item of the divisional image data has been stored in the storage area, wherein the notifying is performed by storing, in a notification queue that is configured to be referenced, notification information that indicates that the item of divisional image data has been stored in the storage area.

8. The non-transitory storage medium of claim 7, wherein, in a case in which there is no partial processing routine that is executable and the notification information is not stored in the notification queue, the computer transitions to a sleep state, and, in a case in which the notification information is stored in the notification queue during a state in which the computer has transitioned to the sleep state, the computer transitions to an active state and effects the control.

9. The non-transitory storage medium of claim 7, wherein the computer effects the control by storing a partial processing routine that is executable in a task queue that is configured to be referenced by the plurality of arithmetic devices.

10. An image processing device configured to execute image processing, using respective objects of an object group in which a plurality of objects configured to execute image processing are connected in a form of a directed acyclic graph, the image processing device comprising a processor configured to:

divide image data, which is an object of the image processing, into a plurality of items of divisional image data;

effect control to cause a plurality of arithmetic devices to execute, in parallel, respective partial processing routines, each of the partial processing routines comprising image processing to be carried out on a corresponding item of the divisional image data that is stored in a predetermined storage area; and in a case in which an item of divisional image data that corresponds to a partial processing routine is stored in the storage area, notify that the item of divisional image data has been stored in the storage area, wherein the processor is configured to control the plurality of arithmetic devices to start an execution of the image processing on the corresponding item of the divisional image data each time the corresponding item of the divisional image data has been stored in the storage area, wherein the processor carries out the notification by storing, in a notification queue that is configured to be referenced processor, notification information that indicates that the item of divisional image data has been stored in the storage area, and in a case in which there is no partial processing routine that is executable and the notification information is not stored in the notification queue, the processor transitions to a sleep state, and, in a case in which the notification information is stored in the notification queue during a state in which the processor has transitioned to the sleep state, the processor transitions to an active state and effects the control.

11. An image processing method executed by an image processing device comprising a processor configured to execute image processing using respective objects of an object group in which a plurality of objects configured to execute image processing are connected in a form of a directed acyclic graph, the image processing method comprising:

dividing image data, which is an object of the image processing, into a plurality of items of divisional image data;

effecting control to cause a plurality of arithmetic devices to execute, in parallel, respective partial processing routines, each of the partial processing routines comprising image processing to be carried out on a corresponding item of the divisional image data that is stored in a predetermined storage area; and in a case in which an item of divisional image data that corresponds to a partial processing routine is stored in the storage area, notifying that the item of divisional image data has been stored in the storage area, wherein the processor is configured to control the plurality of arithmetic devices to start an execution of the image processing on the corresponding item of the divisional image data each time the corresponding item of the divisional image data has been stored in the storage area, wherein the notifying is performed by storing, in a notification queue that is configured to be referenced, notification information that indicates that the item of divisional image data has been stored in the storage area, and in a case in which there is no partial processing routine that is executable and the notification information is not stored in the notification queue, the processor transitions to a sleep state, and, in a case in which the notification information is stored in the notification queue during a state in which the processor has transitioned to the sleep state, the processor transitions to an active state and effects the control.

12. A non-transitory storage medium storing a program that causes a computer to execute image processing using respective objects of an object group in which a plurality of objects configured to execute image processing are connected in a form of a directed acyclic graph, the image processing comprising:

dividing image data, which is an object of the image processing, into a plurality of items of divisional image data;

effecting control to cause a plurality of arithmetic devices to execute, in parallel, respective partial processing routines, each of the partial processing routines comprising image processing to be carried out on a corresponding item of the divisional image data that is stored in a predetermined storage area; and in a case in which an item of divisional image data that corresponds to a partial processing routine is stored in the storage area, notifying that the item of divisional image data has been stored in the storage area, wherein the computer is configured to control the plurality of arithmetic devices to start an execution of the image processing on the corresponding item of the divisional image data each time the corresponding item of the divisional image data has been stored in the storage area, wherein the notifying is performed by storing, in a notification queue that is configured to be referenced, notification information that indicates that the item of divisional image data has been stored in the storage area, and in a case in which there is no partial processing routine that is executable and the notification information is not stored in the notification queue, the computer transitions to a sleep state, and, in a case in which the notification information is stored in the notification queue during a state in which the computer has transitioned to the sleep state, the computer transitions to an active state and effects the control.

* * * * *